Jan. 24, 1961

L. L. BERNHEIM ET AL 2,968,907

PNEUMATIC FRUIT PICKER

Filed May 18, 1959

INVENTORS.
LOUIS L. BERNHEIM
GEORGE M. HARRIS
BY
Kane, Dalsimer and Kane

ATTORNEYS

United States Patent Office 2,968,907
Patented Jan. 24, 1961

2,968,907
PNEUMATIC FRUIT PICKER

Louis L. Bernheim, 2660 Mira Vista Drive, Richmond, Calif., and George M. Harris, 2320 Arlington Blvd., El Cerrito, Calif.

Filed May 18, 1959, Ser. No. 813,982

4 Claims. (Cl. 56—332)

This invention relates to a functionally and structurally improved fruit picker, and more particularly to an automatic picker capable of grasping the fruit and twisting it free from its mounting tree.

An object of this invention is to provide an automatic fruit picker in which the fruit is automatically gripped and twisted free from its mounting tree without effecting any damage or deleterious effects to the fruit or its exposed surfaces.

Another object is to provide an automatic fruit picker capable of removing fruit from locations on a tree that, under ordinary circumstances, cannot be reached or are readily inaccessible when resorting to other fruit picking techniques such as that normally employed by hand where the fruit picker is usually required to mount a ladder.

Still another object is to provide an automatic fruit picker which is not hampered by thick growth of fruit tree branches, as that normally encountered when picking orange trees.

A further object is to provide a relatively simple and inexpensive fruit picker which can be operated automatically and efficiently to remove fruit from its mounting tree.

A fruit picker, fabricated in accordance with the present invention, is provided with an expansible member mounted interiorly of a rotatably driven head, which under normal circumstances is adjacent a chute leading to a receptacle either located on the ground or strapped to the picker operator. The interior of the inflatable member cooperates to provide an expansible chamber which is suitably coupled to a source of air pressure for purposes of selectively inflating this member. Under such circumstances, a fruit may be firmly and resiliently grasped by the inflatable member. When the fruit is thus grasped and substantially simultaneously therewith the head and consequently the expansible member with its contained fruit are rotated to thereby facilitate the twisting of the fruit from its supporting tree. The inflatable member is then collapsed with the result that the fruit is permitted to fall into the chute to be ultimately deposited in the selected receiving receptacle.

Other objects and advantages will become apparent from the following detailed description which is to be taken in conjunction with the accompanying drawings illustrating a preferred embodiment of this invention, and in which.

Figure 5:
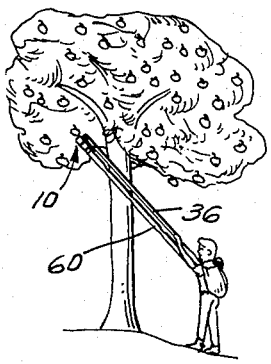
Fig. 5 is a reduced schematic view showing the picker in use.
Figure 1:
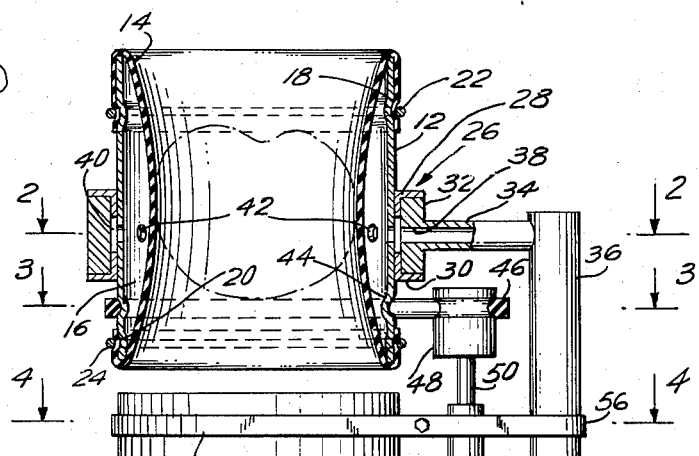
Fig. 1 is a fragmentary elevational view of one form of fruit picker contemplated by this invention with the picking head assembly shown in section and other parts broken away and removed.
Figure 1:
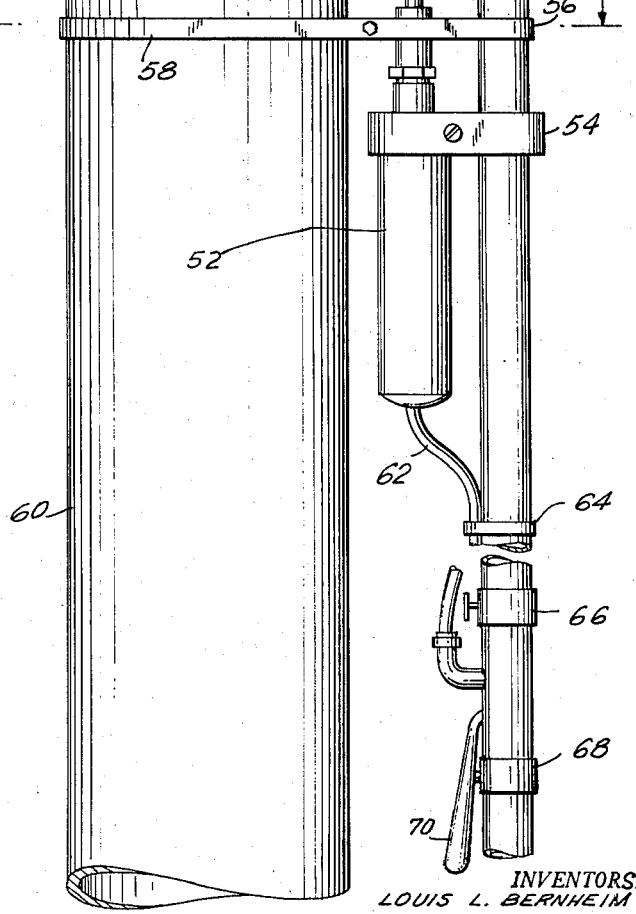
Figure 2:
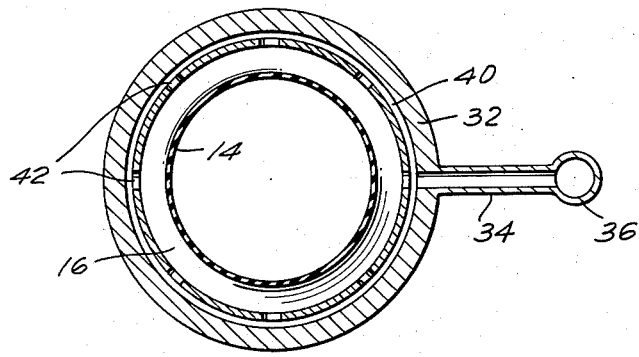
Fig. 2 is a cross-sectional view taken along the line 2—2 of Fig. 1.
Figure 3:
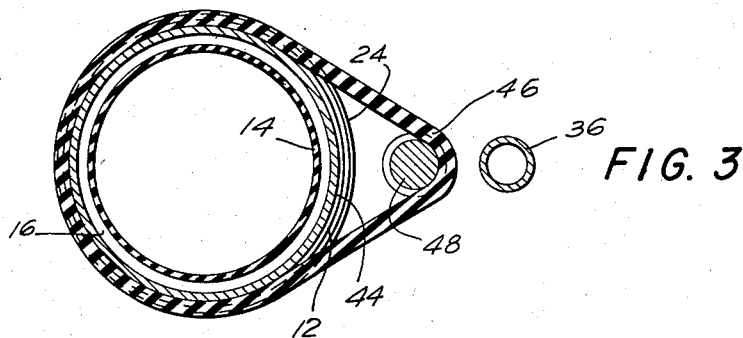
Fig. 3 is a cross-sectional view taken along the line 3—3 of Fig. 1.
Figure 4:
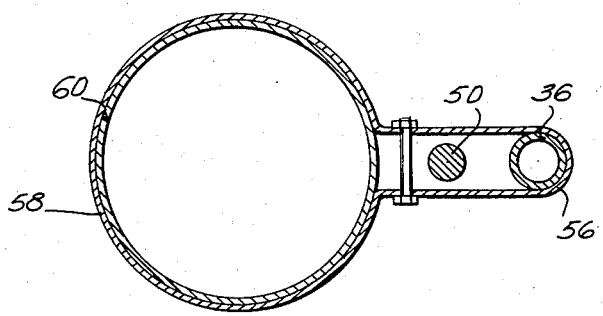
Fig. 4 is a cross-sectional view taken along the line 4—4 of Fig. 1.

In accordance with the embodiment illustrated in these drawings, a picking head assembly 10 includes a substantially cylindrical head 12 and inflatable member or liner 14. The liner 14 may be formed from suitable sheet material which, under certain conditions, may be neoprene. In this connection, liner 14 can be either inherently elastic or assume a bellows-type configuration. Thus, the head 12 cooperates with liner 14 to define an expansible chamber 16 such that when the liner 14 is inflated to the desired amount, the effective internal diameter thereof is less than that of the fruit to be picked. However, when the liner 14 is deflated and permitted to collapse, the proportionment of parts should be such that the picked fruit will be released and permitted to drop under the influence of gravity.

Obviously, any one of the many suitable means and techniques may be employed in affixing member 14 to head 12. As illustrated, the head 12 is formed with spaced annular grooves 18 and 20 adjacent the head upper and lower ends, respectively. The liner 14 is of sufficient length to be folded over these ends in such a manner that its terminal end sectors surround the grooves 18 and 20. These opposed terminal ends of liner 14 are then fixedly disposed within the head grooves 18 and 20 by elastic bands or wire 22 and 24, respectively.

A bearing 26 is coupled to the exterior of head 12 to facilitate the free relative rotation of the picking head assembly 10. In accordance with the illustrated embodiment, this bearing 26 will include a pair of spaced annular and flanged plates 28 and 30. These plates 28 and 30 are secured to the exterior of head 12 and have interposed between their flanges an annular ring 32 which serves to permit relative rotation of the picking head assembly 10 relative thereto. The ring 32, in turn, is secured to a tube 34 of reduced length which extends laterally from main tube 36. The ring 32 is formed with a bore 38 which is in alignment with the bore of tube 34. The parts of bearing 26 cooperate to define an annular chamber 40 which communicates with bore 38 of ring 32 and, by means of a series of spaced circumferentially disposed apertures or holes 42, with the picking head assembly chamber 16.

As stated in the foregoing, the present invention contemplates the automatic rotation of the picking head assembly 10. To this end, the head 12 is provided with a further annular groove 44 which is adapted to receive a drive belt 46 similar to that conventionally employed for such purposes. This drive belt 46 is adapted to be driven by a pulley 48 which is secured to drive shaft 50 of a conventional air motor 52, which is attached to the main tube 36 by means of a fixed bracket 54.

A bracket 56 is similarly mounted on tube 36 and extends into an enlarged annular ring 58, which supports a suspended chute or shaft 60 fabricated from such suitable materials as nylon, canvas or the like. The chute 60 may be contracted at intervals to impede the rate of descent of the fruit therethrough in a manner well known to the art.

The main line 36 is connected to a suitable source of air pressure (not shown) such as an air compressor. It has been found that a sixty p.s.i. air pressure source well proved to be satisfactory under most conditions. An air line 62 branches off main line 36 to supply the requisite energy for air motor 52. A clamp 64 may be employed to prevent undesirable relative movement between the branch line 62 and its main line 36. The air passing through both of these lines is balanced and regulated by means of an adjustable valve 66 which may be of standard construction and of a commercial variety. An operating valve 68 of a standard and commercial type is also incorporated into main line 36 to either completely open or close the passage for air through the main line. To this end, a handle 70 is conveniently mounted to facilitate such actuation of valve 68.

In operation, the member 14 is initially in a deflated condition; and the fruit to be picked is surrounded by the picking head assembly 10 as a result of the operator maneuvering the entire apparatus by holding and manipulating the main air line tube 36. After the valve 66 has been adjusted to regulate the desired air flow in line 36 and its branch 62, the valve handle 70 is depressed to permit the flow of air in both of these conduits. At this time the picking head chamber 16 expands, thereby inflating liner 14. The particular fruit to be picked is resiliently grasped by sectors of the exterior walls of this liner 14. Substantially simultaneously therewith motor 52 is actuated to drive pulley 46, and consequently rotate the picking head assembly 10 in its bearing 26. Accordingly, the gripped fruit is rotated with the picking head assembly 10, and thusly twisted free from its mounting tree.

When this occurs, the handle 70 of valve 68 is released to stop the air flow. The bearing 26 is of such a nature that seepage or leakage of the air within the head chamber 16 is permitted therethrough to thereby deflate member 14. However, this seepage is not sufficient to counteract the air flow and pressure necessary to inflate this member, and accordingly functions in effect as a bleeder valve. Naturally, when the member 14 is deflated, the picked fruit is released and permitted to fall through the chute 60 into the selected receptacle. Upon deflation of member 14, the motor 52 is substantially simultaneously deenergized causing the rotation of the picking head assembly 10 to come to a stop. In this connection, the relationship between the diameter of the pulley 48 and head 12 is of such a nature that the motor 52 need not be geared-down. In a somewhat successful picking apparatus the motor 52 was rated at substantially 20,000 r.p.m. but the head assembly 10 rotated at approximately 2,000 r.p.m. because of the diameter ratio between the pulley 48 and head 12. Obviously, the foregoing cycle is repeated to pick the desired quantity of the selected fruit, without being concerned with any substantial damage to the fruit or the particular location of such fruit on the tree.

It should be evident that the picking head assembly 10 can be rotated continuously during the picking operation by simply branching line 62 from main line 36 at a point below valve 68. In addition, the foregoing bleeder means for the head chamber 16 need not be dependent upon clearance of tolerances between the parts of bearing 26 but may be of any other type either commercially available or well known to those familiar with such devices.

Obviously, other than a single unitary inflatable member 14 can be employed in accordance with the spirit of the present invention. In this connection, a plurality of fruit-gripping means, actuated to an operative position by pneumatic means, are contemplated, as for example a plurality of adjacent or spaced inflatable members interiorly of the head 12.

Thus, the numerous aforementioned objects and advantages are most effectively attained. Although a single preferred embodiment has been disclosed, it should be understood that this invention is in no sense limited thereby, and it is intended that the scope thereof be defined by the appended claims.

We claim:
1. An automatic picker for fruit or the like comprising in combination: a head; a distensible member mounted on said head and cooperating therewith to define an expansible chamber; an assembly operatively connected to said head, said head being rotatably mounted by said assembly; said head having at least one aperature therein in communication with said chamber to permit the passage of fluid under pressure and permit the chamber to be inflated so that the fruit is adapted to be gripped by said liner; and means operatively associated with said head and liner to rotate same, such that the fruit is twisted free from its mounting structure upon being gripped by said liner.

2. An apparatus for picking fruit or the like comprising in combination: a head; a resilient member mounted on said head and defining therewith an expansible chamber; a bearing assembly mounted on said head; said head and bearing assembly having aperatures therein in communication with said chamber to permit the chamber to be inflated by compressed air so that the fruit is gripped by said liner; and means operatively associated with said head and liner to rotate same, such that the fruit is twisted free from its mounting structure upon being gripped by said liner.

3. The invention in accordance with claim 2, wherein said means is driven by an air motor.

4. The invention in accordance with claim 2, wherein a shaft is adjacent said head and is adapted to receive the fruit after it is twisted free from the mounting structure upon deflation of said chamber.

References Cited in the file of this patent
UNITED STATES PATENTS

| | | |
|---|---|---|
| 2,545,072 | Denman | Mar. 13, 1951 |
| 2,775,088 | Bullock | Dec. 25, 1956 |